US012647178B2

(12) United States Patent
Byrne

(10) Patent No.: US 12,647,178 B2
(45) Date of Patent: Jun. 2, 2026

(54) MITIGATING INTERFERENCE BETWEEN SATELLITE AND TERRESTRIAL CELLULAR NETWORKS

(71) Applicant: T-MOBILE INNOVATIONS LLC, Overland Park, KS (US)

(72) Inventor: Cameron Brent Byrne, Seattle, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 382 days.

(21) Appl. No.: 18/203,565

(22) Filed: May 30, 2023

(65) Prior Publication Data

US 2024/0405858 A1 Dec. 5, 2024

(51) Int. Cl.
*H04B 7/185* (2006.01)
*H04W 36/00* (2009.01)

(52) U.S. Cl.
CPC ..... *H04B 7/18541* (2013.01); *H04B 7/18519* (2013.01); *H04W 36/0005* (2013.01)

(58) Field of Classification Search
CPC ............ H04B 7/18519; H04B 7/18541; H04B 7/18563; H04W 36/00; H04W 36/0005; H04W 36/08
See application file for complete search history.

(56) References Cited

U.S. PATENT DOCUMENTS 10,921,458 B2 * 2/2021 Whitefield .............. G01S 19/22
2015/0188644 A1 * 7/2015 Kang ................... H04B 7/2041
455/12.1

| | | | | |
|---|---|---|---|---|
| 2020/0178135 A1* | 6/2020 | Yun | .................. | H04W 36/0061 |
| 2020/0374976 A1* | 11/2020 | Dutta | .................... | H04W 24/10 |
| 2021/0132234 A1* | 5/2021 | Whitefield | .............. | G01S 19/22 |
| 2021/0167820 A1* | 6/2021 | Singh | ................. | H04B 7/18595 |
| 2022/0085874 A1* | 3/2022 | Shrestha | ............ | H04B 7/18541 |
| 2022/0337310 A1* | 10/2022 | Wei | ....................... | H04B 7/1851 |
| 2023/0246667 A1* | 8/2023 | Li | ........................ | H04B 1/0475 |
| | | | | 455/73 |
| 2023/0268986 A1* | 8/2023 | Ma | ..................... | H04B 7/18526 |
| | | | | 370/316 |
| 2023/0299845 A1* | 9/2023 | Nuttall | .............. | H04B 7/18517 |
| | | | | 370/316 |
| 2024/0314680 A1* | 9/2024 | Ozozlu | ................. | H04W 48/16 |

* cited by examiner

*Primary Examiner* — Alpus Hsu
(74) *Attorney, Agent, or Firm* — Shook Hardy & Bacon L.L.P.

(57) ABSTRACT

Methods for mitigating interference between satellite networks and terrestrial cellular networks are provided. Interference may occur when a UE uses an extraterrestrial network when a terrestrial network is available. A method of mitigating interference between an extraterrestrial network and a terrestrial network begins with detecting, by an extraterrestrial access point, that at least one terrestrial access point located within a first geographical area is attempting to communicate with the extraterrestrial access point. The extraterrestrial access point then determines that the first geographical area is covered by at least one terrestrial network. The determining that the first geographical area is covered by at least one terrestrial network may use a dataset of terrestrial network access points. Once the first geographical area has been determined to be covered by at least one terrestrial network, the extraterrestrial access point ceases transmissions to the first geographical network.

20 Claims, 4 Drawing Sheets

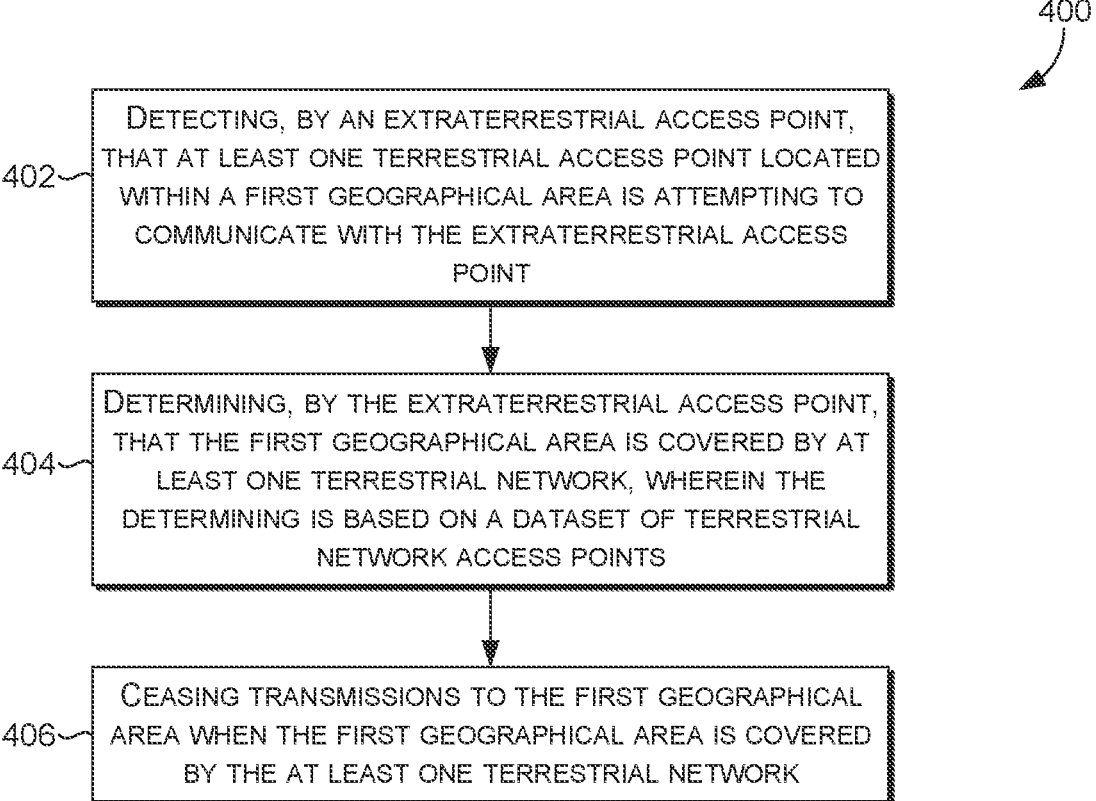

400

402 — DETECTING, BY AN EXTRATERRESTRIAL ACCESS POINT, THAT AT LEAST ONE TERRESTRIAL ACCESS POINT LOCATED WITHIN A FIRST GEOGRAPHICAL AREA IS ATTEMPTING TO COMMUNICATE WITH THE EXTRATERRESTRIAL ACCESS POINT

404 — DETERMINING, BY THE EXTRATERRESTRIAL ACCESS POINT, THAT THE FIRST GEOGRAPHICAL AREA IS COVERED BY AT LEAST ONE TERRESTRIAL NETWORK, WHEREIN THE DETERMINING IS BASED ON A DATASET OF TERRESTRIAL NETWORK ACCESS POINTS

406 — CEASING TRANSMISSIONS TO THE FIRST GEOGRAPHICAL AREA WHEN THE FIRST GEOGRAPHICAL AREA IS COVERED BY THE AT LEAST ONE TERRESTRIAL NETWORK

FIG. 4

MITIGATING INTERFERENCE BETWEEN SATELLITE AND TERRESTRIAL CELLULAR NETWORKS

BACKGROUND

Low earth orbit (LEO) satellites are increasingly used for new customer applications, especially for customers that require coverage in remote areas or who require global access. LEOs may provide internet and other data services to network subscribers. As users rely on mobile devices, known as user equipment (UE), the use cases for UEs has grown considerably. One such use case is to provide cellular service using LEO constellations of satellites. One advantage of satellite networks is the ability to provide coverage in areas where there is little or no terrestrial network service. Satellite network service uses dedicated frequency band, on resources that should not be used when there is sufficient terrestrial network coverage, such as in urban areas. Interference may occur when a satellite transmits a signal into an area served by a terrestrial network.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods for mitigating interference between satellite networks and terrestrial cellular networks are provided. Interference may occur when a UE uses an extraterrestrial network when a terrestrial network is available. A method of mitigating interference between an extraterrestrial network and a terrestrial network begins with detecting, by an extraterrestrial access point, that at least one terrestrial access point located within a first geographical area is attempting to communicate with the extraterrestrial access point. The extraterrestrial access point then determines that the first geographical area is covered by at least one terrestrial network. The determining that the first geographical area is covered by at least one terrestrial network may use a dataset of terrestrial network access points. Once the first geographical area has been determined to be covered by at least one terrestrial network, the extraterrestrial access point ceases transmissions to the first geographical network.

BRIEF DESCRIPTION OF THE SEVERAL VIEWS OF THE DRAWINGS

Implementations of the present disclosure are described in detail below with reference to the attached drawing figures, wherein:

FIG. 4 is a flow a diagram of a method of interference mitigation between a satellite network and a terrestrial cellular network, in accordance with aspects herein.

DETAILED DESCRIPTION

Figure 1:
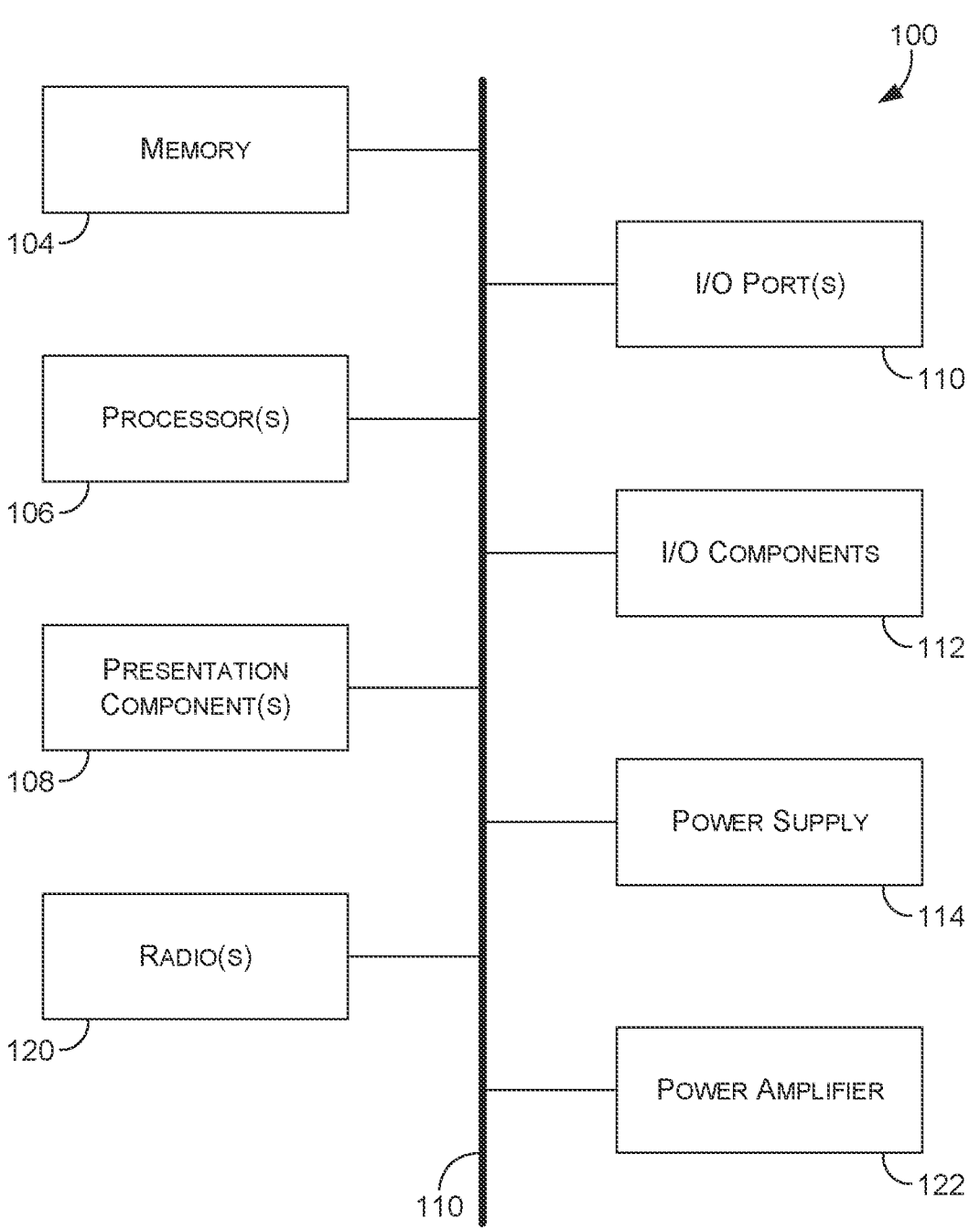
FIG. 1 illustrates an exemplary computing device in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. As used herein, the term "access point" refers to a centralized component or system of components that is configured to wirelessly communicate (receive and/or transmit signals) with a plurality of stations (i.e., wireless communication devices, also referred to herein as user equipment (UE(s)) in a particular geographic area. As used herein, an extraterrestrial access point is distinguished from a terrestrial access point on the basis of its lack of ground coupling; some examples of extraterrestrial access points include airborne (e.g., on an aircraft or airship) and satellites (e.g., low earth orbit (LEO), medium earth orbit (MEO), and geostationary orbit (GEO). As used herein, the term "network access technology (NAT)" is synonymous with wireless communication protocol and is an umbrella term used to refer to the particular technological standard/protocol that governs the communication between a UE and a access point; examples of network access technologies include 3G, 4G, 5G, 6G, 802.11x, and the like.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GEO Geostationary orbit
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs EEPROM Electrically Erasable Programmable Read Only Memory
LED Light Emitting Diode
LEO Low earth orbit satellite
LTE Long Term Evolution
MEO Medium earth orbit
MIMO Multiple Input Multiple Output
MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
QPSK Quadrature Phase Shift Keying
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Signal Received Power
RSRQ Reference Signal Received Quality
RSSI Received Signal Strength Indicator
SINR Signal-to-Interference-Plus-Noise Ratio
SNR Signal-to-Noise Ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, $32^{nd}$ Edition (2022).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of access points (i.e., nodes, cell sites, cell towers) to provide network coverage. The access points are employed to broadcast and transmit transmissions to user devices of the telecommunications network. An access point may be considered to be a portion of a access point that may comprise an antenna, a radio, and/or a controller. In aspects, a access point is defined by its ability to communicate with a user equipment (UE), such as a wireless communication device (WCD), according to a single protocol (e.g., 3G, 4G, LTE, 5G, or 6G, and the like); however, in other aspects, a single access point may communicate with a UE according to multiple protocols. As used herein, a access point may comprise one access point or more than one access point. Factors that can affect the telecommunications transmission include, e.g., location and size of the access points, and frequency of the transmission, among other factors. The access points are employed to broadcast and transmit transmissions to user devices of the telecommunications network. Traditionally, the access point establishes uplink (or downlink) transmission with a mobile handset over a single frequency that is exclusive to that particular uplink connection (e.g., an LTE connection with an EnodeB). In this regard, typically only one active uplink connection can occur per frequency. The access point may include one or more sectors served by individual transmitting/receiving components associated with the access point (e.g., antenna arrays controlled by an EnodeB). These transmitting/receiving components together form a multi-sector broadcast arc for communication with mobile handsets linked to the access point.

The provision of telecommunication services moved beyond the earth's surface decades ago with geostationary satellites providing trunk and backhaul services for the service providers. Today individual users may directly experience satellite communications. While network operators provided service only through terrestrial access points, with satellite communications operators will begin to operate extraterrestrial access points, either on their own or in partnership with third parties. Terrestrial access points provide service to mobile users from fixed locations. The challenge increases when both the UE and the extraterrestrial access point are moving. Users not only move horizontally, they may move vertically as well, moving to locations high above sea level, as well as into remote areas well away from any terrestrial access points. Users may move from an area of excellent mobile terrestrial network capacity and capability to a more remote area that is not served by terrestrial access points. In such cases, the user may move from a terrestrial network to an extraterrestrial network.

As used herein, "access point" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE). The access point may be extraterrestrial or terrestrial. The term/abbreviation UE (also referenced herein as a user device or wireless communications device (WCD)) can include any device employed by an end-user to communicate with a telecommunications network, such as a wireless telecommunications network. A UE may include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby access point. A UE may be, in an embodiment, similar to device 100 described herein with respect to FIG. 1.

As used herein, UE (also referenced herein as a user device or a wireless communication device) can include any device employed by an end-user to communicate with a wireless telecommunications network. A UE may include a mobile device, a mobile broadband adapter, a fixed location or temporarily fixed location device, or any other communications device employed to communicate with the wireless telecommunications network. As examples, a UE may include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby access point.

In aspects, a UE provides UE data including location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point. In other aspects, the processing of said information may be done remotely.

In accordance with a first aspect of the present disclosure a method of mitigating interference between an extraterrestrial network and a mobile network is provided. The method begins with detecting, by an extraterrestrial access point, at least one terrestrial access point located within a first geographical area is attempting to communicate with the extraterrestrial access point. The method then continues with determining, by the extraterrestrial access point, that the first geographical area is covered by at least one terrestrial network, wherein the determining is based on a dataset of terrestrial access points. The method then concludes with ceasing transmissions to the first geographical area when the first geographical area is covered by the at least one terrestrial network.

A second aspect of the present disclosure provides a method of mitigating interference between an extraterrestrial network and a mobile network. The method begins with receiving at least one uplink message from a UE at an extraterrestrial access point. The extraterrestrial access point then transmits a handover message to the UE, wherein the handover message is based on the extraterrestrial access point being instructed not to transmit into a geographical area associated with the UE.

Another aspect of the present disclosure is directed to a non-transitory computer storage media storing computer-useable instructions that, when executed by one or more processors cause the processors to detect, by processors at an extraterrestrial access point, that at least one UE located within a first geographical area is attempting to communicate with the extraterrestrial access point. The processors at the extraterrestrial access point then determine that the first geographical area is covered by at least one terrestrial network, with the determining based on a dataset of terrestrial access points. The extraterrestrial access point then ceases transmissions to the at least one UE located within the first geographical area when the first geographical area is covered by the at least one terrestrial network.

FIG. 1 illustrates an exemplary computing device in which implementations of the present disclosure may be employed, in accordance with aspects herein. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a UE, wireless communication device, or user device, The computing device 100 may take many forms; non-limiting examples of the computing device 100 include a fixed wireless access device, cell phone, tablet, internet of things (IOT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, power supply 114, one or more radios, and a power amplifier (PA) 122. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

The radio(s) 120 represent radios that facilitate communication with one or more wireless networks using one or more wireless links. In aspects, the radio(s) 120 utilize transmitters to communicate with a wireless network on a first wireless link and a second wireless link. It is expressly conceived that a computing device with a single radio could facilitate communication over one or more wireless links with one or more wireless networks via multiple transmitters. Illustrative wireless telecommunications technologies include CDMA, GPRS, TDMA, GSM, and the like. One or both of the radio(s) 120 and the may carry wireless communication functions or operations using any number of desirable wireless communication protocols, including 802.11 (Wi-Fi), WiMAX, LTE, 3G, 4G, LTE, 5G, NR, VOLTE, or other VoIP communications. In aspects, the radio(s) 120 may be configured to communicate using the same protocol but in other aspects they may be configured to communicate using different protocols. In some embodiments, including those that both radios or both wireless links are configured for communicating using the same protocol, the radio(s) 120 may be configured to communicate on distinct frequencies or frequency bands (e.g., as part of a carrier aggregation scheme). As can be appreciated, in various embodiments, each of the radio(s) 120 can be configured to support multiple technologies and/or multiple frequencies; for example, the radio(s) 120 may be configured to communicate with a access point according to a cellular communication protocol (e.g., 4G, 5G, 6G, or the like) using a first radio, and may use a second radio to communicate with one or more other computing devices according to a local area communication protocol (e.g., IEEE 802.11 series, Bluetooth, NFC, z-wave, or the like).

Figure 2:
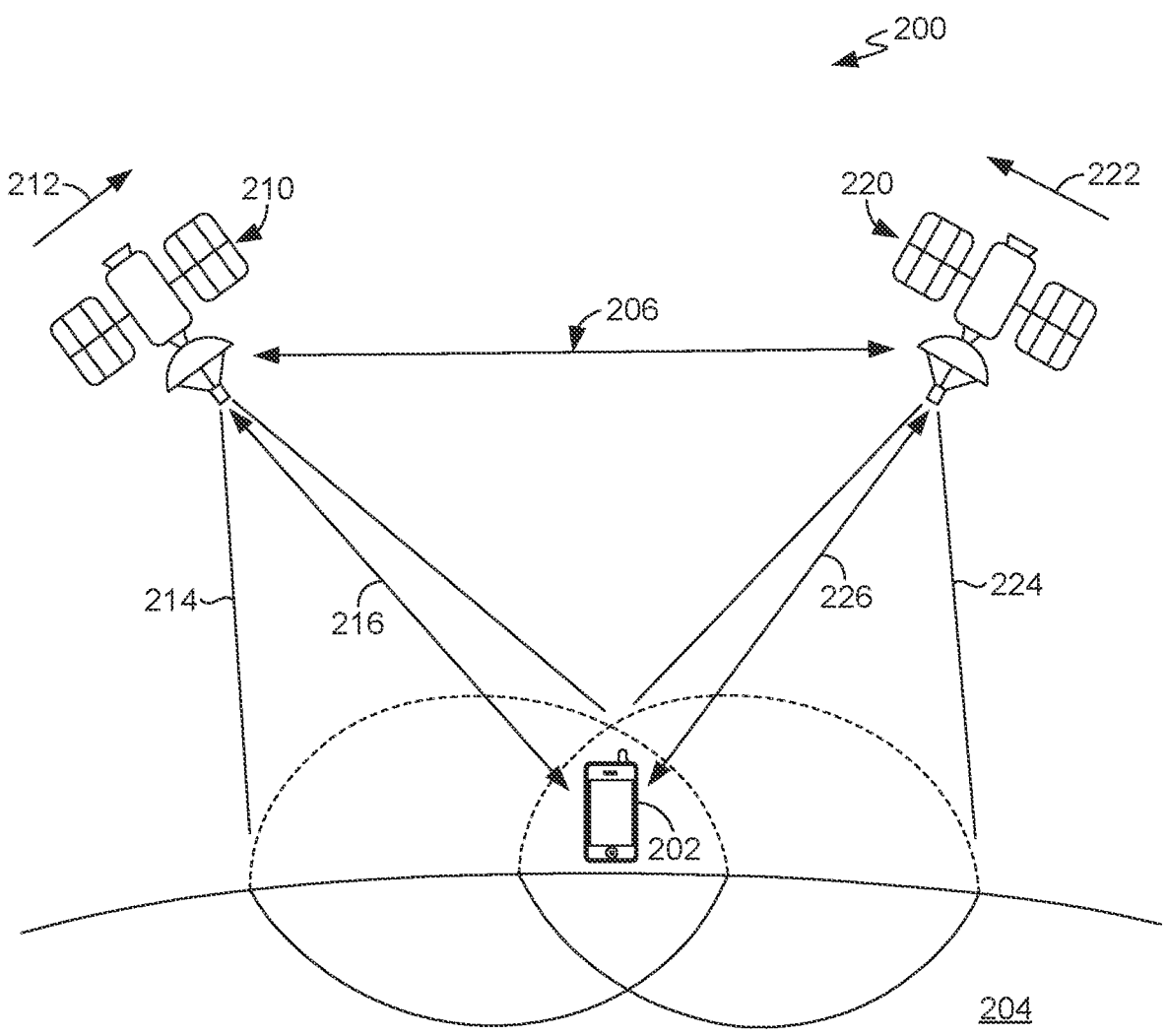
FIG. 2 depicts a diagram of an exemplary environment suitable for use in implementations of the present disclosure, in accordance with aspects herein.

FIG. 2 depicts a diagram of an exemplary environment suitable for use in implementations of the present disclosure, in accordance with aspects herein. Such a network environment is illustrated and designated generally as network environment 200. At a high level the network environment 200 comprises a UE 202 that is at an altitude on the earth 204, and two or more extraterrestrial access points, represented in FIG. 2 as a first extraterrestrial access point 210 and a second extraterrestrial access point 220. The altitude and location of UE 202 may vary and the UE 202 may encounter weather conditions that may attenuate a signal received from either first extraterrestrial access point 210 or second extraterrestrial access point 220. The UE 202 may communicate through either first extraterrestrial access point 210 or second extraterrestrial access point 220. Though each of the first extraterrestrial access point 210 and the second extraterrestrial access point 220 are illustrated as being satellites, it should be understood that the present disclosure is not limited to space-based implementations; either or both of the first extraterrestrial access point 210 and the second extraterrestrial access point 220 may be in the form of an aircraft or any other non-terrestrial access point. Similarly, though the UE 202 is illustrated as a cellular phone, the UE 202 may be any computing device described with respect to FIG. 1.

Each of the first extraterrestrial access point 210 and the second extraterrestrial access point 220 are configured to wirelessly communicate with the UE 202. In aspects, each of the extraterrestrial access points may communicate with the UE using any wireless telecommunication protocol desired by a network operator, including but not limited to 3G, 4G, 5G, 6G, 802.11x and the like. Each of the first extraterrestrial access point 210 and the second extraterrestrial access point 220 may establish a wireless connection with the UE 202; the first extraterrestrial access point 210 may communicate with the UE 202 using a first wireless link 216 and the second extraterrestrial access point 220 may communicate with the UE 202 using a second wireless link 226. Though illustrated as a two-way communication link, either or both of the first wireless link 216 and the second wireless link 226 may be one-way (i.e., downlink only) instead of bi-directional (i.e., downlink and uplink). Each of the first extraterrestrial access point 210 and the extraterrestrial access point may be said to provide telecommunication coverage to a geographic area; as illustrated in FIG. 2, the first extraterrestrial access point 210 may be said to serve a first geographic coverage area 214 and the second extraterrestrial access point 220 may be said to serve a second geographic coverage area 224. Further, FIG. 2 illustrates that each of the first extraterrestrial access point 210 and the second extraterrestrial access point 220 are in motion relative to the UE 202; that is, the first extraterrestrial access point 210 may be said to moving along a first track 212 and the second extraterrestrial access point 220 may be said to be moving along a second track 222. Despite the illustrated embodiment, in some aspects of the present disclosure, either or both of the first extraterrestrial access point 210 and the second extraterrestrial access point 220 may be stationary with respect to a point on the earth 204 (i.e., the extraterrestrial access point may be in a GEO orbit). In addition to the connection between the extraterrestrial access points and the UE 202, in some aspects of the present disclosure, the first extraterrestrial access point 210 may be communicatively coupled, via a direct connection link 206, to the second extraterrestrial access point 220; in other aspects, the first extraterrestrial access point 210 may be communicatively coupled to the second extraterrestrial access point 220 via one or more ground stations (not illustrated so as not to obscure other portions of the invention). The first extraterrestrial access point 210 may be coupled to second extraterrestrial access point 220 in a master slave relationship.

Figure 3:
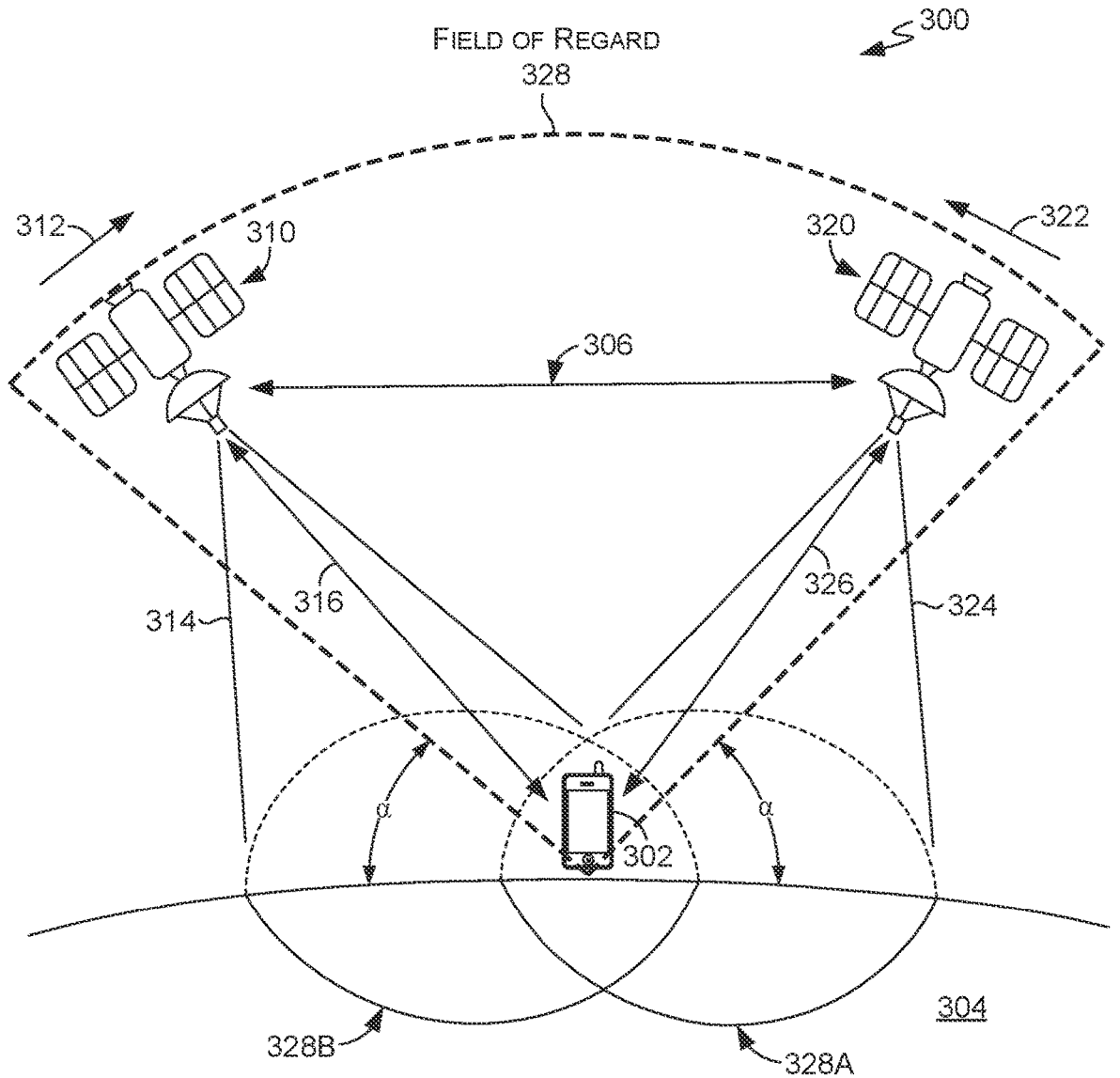
FIG. 3 depicts a diagram of interference mitigation between a satellite network and a terrestrial cellular network, in accordance with aspects herein.

FIG. 3 depicts a diagram of interference mitigation between a satellite network and a terrestrial cellular network, in accordance with aspects herein. At a high level the network environment 300 comprises a UE 302 that is at an altitude on or above the earth 304. The UE 302 may be located in an airplane and may be at a higher altitude. The UE 302 may also be moving and may travel from an area where it is necessary to use the extraterrestrial network due to a lack of terrestrial network coverage to an area with good terrestrial network coverage. FIG. 3 also includes one or more extraterrestrial access points, represented in FIG. 3 as a first extraterrestrial access point 310 and a second extraterrestrial access point 320. The first extraterrestrial access point 310 and the second extraterrestrial based station may implement interference mitigation techniques between extraterrestrial networks and terrestrial networks. Additional extraterrestrial access points may be located on additional LEO satellites. If more than one LEO satellite is serving the area, then two sub-arrays of antennas may be used to receive and transmit from the multiple satellites.

Low latency between first extraterrestrial access point 310 and second extraterrestrial access point 320 may be achieved using a free space optical link 306 between the two satellites. In aspects described further below, one extraterrestrial access point may cover a different geographical area than a second extraterrestrial access point. Though each of the first extraterrestrial access point 310 and the second extraterrestrial access point 320 are illustrated as being satellites, it should be understood that the present disclosure is not limited to space-based implementations; either or both of the first extraterrestrial access point 310 and the second extraterrestrial access point 320 may be in the form of an aircraft or any other non-terrestrial access point. Similarly, though the UE 302 is illustrated as a cellular phone, the UE 302 may be any computing device described with respect to FIG. 1.

Each of the first extraterrestrial access point 310 and the second extraterrestrial access point 320 are configured to wirelessly communicate with the UE 302. In aspects, each of the extraterrestrial access points may communicate with the UE using any wireless telecommunication protocol desired by a network operator, including but not limited to 3G, 4G, 5G, 6G, 802.11x and the like. Each of the first extraterrestrial access point 310 and the second extraterrestrial access point 320 may establish a wireless connection with the UE 302; the first extraterrestrial access point 310 may communicate with the UE 302 using a first direct connection link 316 and the second extraterrestrial access point 320 may communicate with the UE 302 using a second direct connection link 326. Though illustrated as a two-way communication link, either or both of the first direct connection link 316 and the second direct connection link 326 may be one-way (i.e., downlink only) instead of bi-directional (i.e., downlink and uplink). Each of the first extraterrestrial access point 310 and the extraterrestrial access point may be said to provide telecommunication coverage to a geographic area; as illustrated in FIG. 3, the first extraterrestrial access point 310 may be said to serve a first geographic coverage area 314 and the second extraterrestrial access point 320 may be said to serve a second geographic coverage area 324. The first geographic coverage area 314 area may be an area not served well by a terrestrial network, while the second geographic coverage area 324 may be an urban area well-served by a terrestrial network. Further, FIG. 3 illustrates that each of the first extraterrestrial access point 310 and the second extraterrestrial access point 320 are in motion relative to the UE 302; that is, the first extraterrestrial access point 310 may be said to moving along a first track 312 and the second extraterrestrial access point 320 may be said to be moving along a second track 322. Despite the illustrated embodiment, in some aspects of the present disclosure, either or both of the first extraterrestrial access point 310 and the second extraterrestrial access point 320 may be stationary with respect to a point on the earth 304 (i.e., the extraterrestrial access point may be in a GEO orbit). In addition to the connection between the extraterrestrial access points and the UE 302, in some aspects of the present disclosure, the first extraterrestrial access point 310 may be communicatively coupled, via a free space optical link 306, to the second extraterrestrial access point 320; in other aspects, the first extraterrestrial access point 310 may be communicatively coupled to the second extraterrestrial access point 320 via one or more ground stations (not illustrated so as not to obscure other portions of the invention).

FIG. 3 also depicts the field of regard 328 A of first extraterrestrial access point 310 and the field of regard 328 B of second extraterrestrial access point 320. The field of regard is the total area that can be captured by a moving extraterrestrial access point and is the angular cone perceivable by the extraterrestrial access point at a particular instant of time. A UE 302 can communicate with first extraterrestrial access point 310 when transmitting and/or receiving within the field of regard. As UE 302 moves toward the boundary of the field of regard 328 A the UE may be handed off to second extraterrestrial access point 320.

The extraterrestrial network may use a dedicated frequency band, which is a scarce resource for communication. This dedicated frequency band should be used in areas that do not have access to terrestrial networks. It is desirable to prevent UEs from attaching to the extraterrestrial network in areas where interference from terrestrial networks is likely.

A UE 302 in FIG. 3 communicates with a first extraterrestrial access point 310 and transmits a signal at an angle a to the earth 304. If α is 30°, then the link budget may have a margin of +3 dB. This example assumes that the frequency in use is 600 MHz and uses QPSK modulation at a data rate of 10 kbps. Continuing with the example, the UE 302 may use an uplink transmit power of 1.0 watt and have an antenna gain of 0 dB. The downlink power used by the first extraterrestrial access point 310 to transmit to UE 302 may be part of a link budget of +4.3 dB. In contrast, when the first extraterrestrial access point 310 is at an α of 90° the uplink link budget is 8.4 dB and the downlink link budget is 9.8 dB.

The link budget determines how many UEs may be served by a particular extraterrestrial access point. A UE, such as UE 302 that is at a higher altitude may be served by a lower downlink power setting from the first extraterrestrial access point 310. A UE in an airplane may be served by an even lower downlink power settings. Using the minimum amount of downlink transmit power allows an extraterrestrial access point to serve additional UEs. As a UE moves through the field of regard of the extraterrestrial access point a higher downlink power may be necessary for an extraterrestrial access point to provide service. At some point, a UE that is at a lower altitude as well as a UE that is at a margin of the field of regard may need to be transferred to a different extraterrestrial access point, such as second extraterrestrial access point 320 for service. Transfers may also occur from an extraterrestrial network to a terrestrial network as the UE 302 moves from the first geographic coverage area 314 to the second geographic coverage area 324.

When the UE 302 moves into the second geographic coverage area 324 a transfer from the extraterrestrial network using first extraterrestrial access point 310 and second extraterrestrial access point 320 occurs. Because the second geographic coverage area 324 is well served by the terrestrial network the extraterrestrial access points 310 and 320 do not transmit within the field of regard 328A the may cover second geographic coverage area 324. Both satellites may detect and learn the location of terrestrial cell sites broadcasting along their orbital paths. Based on detecting this information the satellites may adjust the spectrum bands used or may cease transmitting so as not to interfere with the terrestrial network services in the areas served by terrestrial access points along the orbital path. The access points along the orbital paths may incorporate antennas with a higher transmission angle to facilitate detection of the access point by the satellites.

The satellites may store an onboard map of areas where transmission should not occur due to adequate service by terrestrial networks. The satellites may also operate cooperatively with other satellites in the constellation and may share information through free space optical link 306 to ensure that extraterrestrial operations occur over areas not served by terrestrial networks. As terrestrial network service is built out, the onboard maps are updated to reflect updated areas where extraterrestrial service is not to be used.

FIG. 4 is a flow a diagram of a method of interference mitigation between a satellite network and a terrestrial cellular network, in accordance with aspects herein. The method 400 begins in block 402 with detecting, by an extraterrestrial access point, at least one terrestrial access point located within a first geographical area is attempting to communicate with the extraterrestrial access point. The method continues in block 404 with determining, by the extraterrestrial access point, that the first geographical area is covered by at least one terrestrial network, wherein the determining is based on a dataset of terrestrial network access points. The method then concludes in block 406 with ceasing transmissions to the first geographical area when the first geographical area is covered by the at least one terrestrial network.

The extraterrestrial access point may resume transmissions to the UE after the UE has exited the first geographical area. Blanking or ceasing transmissions to the first geographical area may block a dedicated satellite cellular network frequency band. The method may continue with determining, by an extraterrestrial access point that a second geographical area is not covered by at least one terrestrial network. The determining may be based on a dataset, which may be a map that may be stored on the extraterrestrial access point. The ceasing operation using an extraterrestrial access point may also be based on the extraterrestrial access point receiving an uplink transmission from at least one terrestrial access point located within the first geographical area on a prior orbit.

Once the comparison is made and it is determined that the first geographical area is contained in the dataset, any UE served by the extraterrestrial access point in the first geographical area will complete a handover to a terrestrial access point in the first geographical area. The handover may also be based on a UE moving from a first geographical area to a second geographical area. The dataset may be updated based on information received from terrestrial access points during an orbit, or may be updated by an out-of-band transmission containing an updated dataset or map.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of mitigating interference between an extraterrestrial network and at least one terrestrial network, the method comprising:

detecting, by an extraterrestrial access point, that at least one terrestrial access point located within a first geographical area is attempting to communicate with the extraterrestrial access point;

determining, by the extraterrestrial access point, that the first geographical area is covered by the at least one terrestrial network, wherein the determining is based on a dataset of geographical coverage areas of terrestrial network access points of the at least one terrestrial network; and ceasing wireless transmissions to at least one user equipment (UE) within the first geographical area based on the first geographical area being covered by the at least one terrestrial network.

2. The method of claim 1, further comprising determining, by the extraterrestrial access point, that a second geographical area is not covered by the at least one terrestrial network, wherein the determining is based on the of the geographical coverage areas of the terrestrial network access points.

3. The method of claim 1, wherein the dataset is a map of the geographical coverage areas of the terrestrial access points of the at least one terrestrial network.

4. The method of claim 3, wherein the map is stored at the extraterrestrial access point.

5. The method of claim 1, wherein the dataset includes uplink transmissions received from the at least one terrestrial access point on an orbit.

6. The method of claim 2, further comprising completing a handover of the at least one UE to the at least one terrestrial access point in the first geographical area based on the at least one UE entering the first geographical area.

7. The method of claim 6, wherein the handover of the at least one UE is further based on the at least one UE moving from the second geographical area to the first geographical area.

8. The method of claim 1, further comprising updating the dataset based on receipt of an out-of-band transmission by the extraterrestrial access point.

9. The method of claim 1, further comprising updating the dataset based on detecting terrestrial access points during an orbit of the extraterrestrial access point.

10. A non-transitory computer storage media storing computer readable instructions that, when executed by one or more processors, cause the one or more processors to:

detect, by the one or more processors at an extraterrestrial access point, that at least one user equipment (UE) located within a first geographical area is attempting to communicate with the extraterrestrial access point;

determine, by the processors at the extraterrestrial access point, that the first geographical area is covered by at least one terrestrial network, wherein the determining is based on a dataset of geographical coverage areas of terrestrial access points of the at least one terrestrial network; and cease wireless transmissions to the at least one UE located within the first geographical area based on the first geographical area being covered by the at least one terrestrial network.

11. The non-transitory computer storage media of claim 10, wherein the computer-readable instructions cause the one or more processors to resume the wireless transmissions based on the at least one UE exiting the first geographical area.

12. The non-transitory computer storage media of claim 10, wherein ceasing the wireless transmissions to the first geographical area halts use of a dedicated satellite cellular network frequency band.

13. The non-transitory computer storage media of claim 10, wherein ceasing the wireless transmissions to the first geographical area is based on uplink transmissions received from at least one terrestrial access point on a prior orbit.

14. The non-transitory computer storage media of claim 10, wherein the computer-readable instructions cause the one or more processors to handover the at least one UE to at least one terrestrial access point of the at least one terrestrial network.

15. The non-transitory computer storage media of claim 10, wherein the dataset comprises a map of the geographical coverage areas of the terrestrial access points where the at least one terrestrial network provides service.

16. The non-transitory computer storage media of claim 10, wherein the dataset is updated to add a geographical coverage area of an onboarded terrestrial access point of the at least one terrestrial network.

17. The non-transitory computer storage media of claim 10, wherein the dataset is updated based on the extraterrestrial access point receiving an out-of-band transmission comprising an updated dataset.

18. The non-transitory computer storage media of claim 10, wherein the computer-readable instructions cause the one or more processors to determine a second geographical area is not covered by the at least one terrestrial network based on the dataset of the geographical coverage areas of the terrestrial access points.

19. The non-transitory computer storage media of claim 18, wherein the computer-readable instructions cause the one or more processors to handover the at least one UE to the at least one terrestrial access point in the first geographical area based on the UE entering the first geographical area.

20. The non-transitory computer storage media of claim 18, wherein the computer-readable instructions cause the one or more processors to resume the wireless transmissions based on the UE exiting the first geographical area and entering the second geographical area.

* * * * *